US008630595B2

(12) United States Patent
Karmi et al.

(10) Patent No.: US 8,630,595 B2
(45) Date of Patent: Jan. 14, 2014

(54) SYSTEM, METHOD AND APPARATUS FOR TRANSMIT DIVERSITY CONTROL BASED ON VARIATIONS IN PROPAGATION PATH (71) Applicant: Google Inc., Mountain View, CA (US)

(72) Inventors: Yair Karmi, Bridgewater, NJ (US); Eduardo Abreu, Allentown, PA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/738,759

(22) Filed: Jan. 10, 2013

(65) Prior Publication Data
US 2013/0143505 A1 Jun. 6, 2013

Related U.S. Application Data

(63) Continuation of application No. 12/038,937, filed on Feb. 28, 2008, now abandoned, which is a continuation-in-part of application No. 11/712,569, filed on Mar. 1, 2007, now Pat. No. 7,991,365.

(60) Provisional application No. 60/904,198, filed on Mar. 1, 2007.

(51) Int. Cl.
*H03C 7/02* (2006.01)
*H04B 1/02* (2006.01)

(52) U.S. Cl.
USPC .............. 455/101; 455/522; 455/69; 375/267

(58) Field of Classification Search
USPC .................. 455/69, 522, 101, 127.1–127.5; 375/267
See application file for complete search history.

(56) References Cited

U.S. PATENT DOCUMENTS

| 5,642,353 A | 6/1997 | Roy et al. |
| 5,832,044 A | 11/1998 | Sousa et al. |
| 5,991,330 A | 11/1999 | Dahlman et al. |

(Continued)

FOREIGN PATENT DOCUMENTS

| EP | 0986193 | 3/2000 |
| EP | 1282242 A1 | 2/2003 |

(Continued)

OTHER PUBLICATIONS

Derryberry et al., "Transmit Diversity in 3G CDMA Systems", Wideband Wireless Access Technologies to Broadband Internet, IEEE Communications Magazine, Apr. 2002, pp. 68-75.

(Continued)

*Primary Examiner* — Edward Urban
*Assistant Examiner* — Rui Hu
(74) *Attorney, Agent, or Firm* — Gottlieb, Rackman & Reisman, PC (57) ABSTRACT

A method and apparatus for applications of identification of variations of propagation path to transmit diversity control. Transmit diversity parameters may be modified according to detected dynamics, which may, for example, be related to changes in actual propagation and network conditions. Such dynamics may be referred to as mobility parameters. Mobility parameters may apply to variability in a propagation path due to any conditions. Determination of a mobility parameter may be conducted using one or more of multiple parameters available to the mobile terminal. Such feedback information indication, which is related to the propagation path conditions, may be provided to the apparatus, which would attempt to find a more desired mode of operation, which may lead to reduction in power and the improvement of the quality of transmission.

11 Claims, 9 Drawing Sheets

(56) References Cited

U.S. PATENT DOCUMENTS

| | | | | |
|---|---|---|---|---|
| 5,999,826 | A * | 12/1999 | Whinnett | 455/561 |
| 6,131,016 | A * | 10/2000 | Greenstein et al. | 455/69 |
| 6,185,440 | B1 | 2/2001 | Barratt et al. | |
| 6,192,256 | B1 * | 2/2001 | Whinnett | 455/562.1 |
| 6,226,509 | B1 | 5/2001 | Mole et al. | |
| 6,236,363 | B1 | 5/2001 | Robbins et al. | |
| 6,330,294 | B1 | 12/2001 | Ansbro et al. | |
| 6,343,218 | B1 | 1/2002 | Kaneda et al. | |
| 6,370,369 | B1 * | 4/2002 | Kraiem et al. | 455/277.1 |
| 6,392,988 | B1 | 5/2002 | Allpress et al. | |
| 6,492,942 | B1 | 12/2002 | Kezys | |
| 6,526,291 | B1 * | 2/2003 | Ekstrom et al. | 455/562.1 |
| 6,584,161 | B2 * | 6/2003 | Hottinen et al. | 375/299 |
| 6,636,495 | B1 | 10/2003 | Tangemann | |
| 6,690,652 | B1 * | 2/2004 | Sadri | 370/252 |
| 6,704,370 | B1 | 3/2004 | Chheda et al. | |
| 6,745,009 | B2 | 6/2004 | Raghothaman | |
| 6,754,473 | B1 * | 6/2004 | Choi et al. | 455/101 |
| 6,766,146 | B1 * | 7/2004 | Park et al. | 455/69 |
| 6,810,264 | B1 | 10/2004 | Park et al. | |
| 6,859,643 | B1 | 2/2005 | Ma | |
| 6,882,228 | B2 | 4/2005 | Rofougaran | |
| 7,099,634 | B2 * | 8/2006 | Tanaka | 455/101 |
| 7,200,368 | B1 * | 4/2007 | Hottinen et al. | 455/101 |
| 7,248,638 | B1 * | 7/2007 | Banister | 375/267 |
| 7,353,001 | B1 * | 4/2008 | Ngan | 455/63.4 |
| 7,463,700 | B2 * | 12/2008 | Dabak et al. | 375/316 |
| 7,610,024 | B2 * | 10/2009 | Laroia et al. | 455/101 |
| 7,729,714 | B2 * | 6/2010 | Black et al. | 455/522 |
| 7,885,617 | B2 * | 2/2011 | Usuda et al. | 455/91 |
| 8,280,320 | B2 * | 10/2012 | Hwang et al. | 455/101 |
| 2002/0151322 | A1 * | 10/2002 | Agin et al. | 455/522 |
| 2003/0002594 | A1 * | 1/2003 | Harel et al. | 375/299 |
| 2003/0112880 | A1 | 6/2003 | Walton et al. | |
| 2003/0148738 | A1 * | 8/2003 | Das et al. | 455/67.5 |
| 2003/0162511 | A1 * | 8/2003 | Kim et al. | 455/101 |
| 2004/0048584 | A1 | 3/2004 | Vaidyanathan et al. | |
| 2004/0067739 | A1 * | 4/2004 | Sim et al. | 455/101 |
| 2004/0077378 | A1 * | 4/2004 | Kim et al. | 455/562.1 |
| 2004/0085239 | A1 | 5/2004 | Ukena et al. | |
| 2004/0171357 | A1 * | 9/2004 | Lobinger et al. | 455/101 |
| 2004/0203451 | A1 * | 10/2004 | Braun et al. | 455/67.11 |
| 2005/0003768 | A1 * | 1/2005 | Laroia et al. | 455/101 |
| 2005/0014474 | A1 * | 1/2005 | Jitsukawa et al. | 455/101 |
| 2005/0059355 | A1 | 3/2005 | Liu | |
| 2005/0143113 | A1 | 6/2005 | Lee et al. | |
| 2006/0267983 | A1 | 11/2006 | Karmi et al. | |
| 2006/0270359 | A1 | 11/2006 | Karmi et al. | |
| 2007/0142074 | A1 * | 6/2007 | Black et al. | 455/522 |
| 2008/0123775 | A1 | 5/2008 | Abreu et al. | |
| 2008/0160922 | A1 | 7/2008 | Sun et al. | |
| 2008/0214128 | A1 * | 9/2008 | Lim et al. | 455/101 |
| 2008/0298317 | A1 * | 12/2008 | Yang et al. | 370/329 |
| 2010/0141528 | A1 * | 6/2010 | Harel et al. | 342/368 |

FOREIGN PATENT DOCUMENTS

| | | |
|---|---|---|
| EP | 1282244 A1 | 2/2003 |
| EP | 1284545 A1 | 2/2003 |
| EP | 1262031 A1 | 5/2004 |
| GB | 2353437 A | 2/2001 |
| JP | 09238098 A | 9/1997 |
| JP | 2000151484 A | 5/2000 |
| WO | 97/24818 | 7/1997 |
| WO | 00/79701 A1 | 12/2000 |
| WO | 01/69814 | 9/2001 |
| WO | 03/090386 | 10/2003 |
| WO | 2004/045108 | 5/2004 |
| WO | 2005/081444 | 9/2005 |

OTHER PUBLICATIONS

Rashid-Farrokhi, et al., "Transmit Beamforming and Power Control for Cellular Wireless Systems", IEEE Journal on Selected Areas in Communications. vol. 16. No. 8, Oct. 1998, pp. 1437-1450.

* cited by examiner

SYSTEM, METHOD AND APPARATUS FOR TRANSMIT DIVERSITY CONTROL BASED ON VARIATIONS IN PROPAGATION PATH

CROSS REFERENCE TO RELATED APPLICATIONS

This application is a continuation application of U.S. patent application Ser. No. 12/038,937, filed Feb. 28, 2008, which is a continuation in part of U.S. patent application Ser. No. 11/712,569, entitled "Method, System and Apparatus for Estimation of Propagation Path Variability of a Transmit Diversity Channel" and filed Mar. 1, 2007, now U.S. Pat. No. 7,991,365 and also claims benefit of U.S. Provisional Patent Application Ser. No. 60/904,198, entitled "Applications of Identification of Variations in Propagation Path to Transmit Diversity Control" and filed Mar. 1, 2007, the entirety of all of which are incorporated by reference herein.

FIELD OF THE INVENTION

The present invention relates generally to the field of wireless communications, and more specifically to methods, systems and apparatus for transmit diversity control related to propagation path conditions.

BACKGROUND OF THE INVENTION

Wireless transmission systems may use transmit diversity, whereby signals are transmitted to a receiver using a plurality of transmit antennas. A receiving communication device extracts the information from the transmitted signals. Multiple antenna elements may enhance spectral efficiency and capacity, allowing for more users to be simultaneously served over a given frequency band, while reducing signal degradation caused by multi-path and fading. Transmit diversity parameters may be applied to signals transmitted from two or more antennas, and may modify an effective power distribution detected by receivers, such as base stations. The transmitted signals may propagate along different paths and may reach the receiving communication device with different phases that may destructively interfere. The received signal quality may change at a receiver that may be attempting to detect a transmission from a mobile terminal, as well as a noise level created by a wireless terminal transmission in base stations attempting to detect signals from other wireless terminals. A signal-to-noise ratio perceived by base stations may change with varying parameters of transmit diversity control. There is a need for a system, method and apparatus to reduce interference of transmitted signals.

SUMMARY OF EMBODIMENTS OF THE INVENTION

In accordance with the present invention, disadvantages and problems associated with previous techniques for transmit diversity power control may be reduced or eliminated. The present invention applies to wireless communication systems that provide transmit diversity control algorithms related to the propagation path conditions, including systems that use uplink power control.

When propagation conditions are stable or vary slowly, small changes of parameters around values previously defined may provide good performance and more stable operation and maximize benefits of transmit diversity control. In a dynamic environment, such as when a mobile terminal may be moving or other objects in the vicinity may cause variations of the propagation path between a transmitter and a receiver, transmit diversity control may achieve improved performance by, for example, allowing a larger change in a transmit diversity control algorithm parameter. A transmit diversity parameter may be, for example, a step size in a phase difference between signals transmitted on the respective plurality of antennas, or may be a smaller interval between changes in parameters. A faster rate of change of a transmit diversity parameter may allow faster adaptation of a transmit diversity control parameter to a varying propagation condition.

Several methods of applying the identification of variability in propagation path, known as mobility, to transmit diversity control are defined herein. A mobility parameter may characterize the stability of the propagation path. A mobility parameter may be related to changes in actual propagation and network conditions, and may apply to variability in a propagation path due to any conditions. Higher values of mobility parameter may correspond to fast variation in uplink propagation path loss, characteristic of a moving mobile terminal. However, a stationary mobile terminal may also experience varying path loss as a result of changes in the environment, such as other moving objects, movement of the holder of the terminal, rotation of the terminal, etc.

Determination of a mobility parameter may be conducted using one or more of multiple parameters available to the mobile terminal. A mobility parameter that may be used may be a measure of signal quality, for example, a standard deviation of a signal quality of a received parameter across a window. This parameter may be used, for example, in lieu or in addition to a power difference. Other power differences or other similar parameters may be selected within the scope of this invention.

The value of a mobility parameter may be determined by observing variations in power in the transmitted or received signals. For example, one method according to embodiments of the invention may detect a difference in power within a time window to detect changes in dynamics of propagation path. In some embodiments of the invention, one or both of phase difference and power ratio may be used to compute the value of the mobility parameter, which in turn may be used to provide flexibility and/or adaptability in cases where the channel amplitude and phase vary at different rates. For example, a phase-based mobility parameter may be used to adjust the transmit diversity phase difference step size and/or a power-based mobility parameter may be used to adjust the transmit diversity power ratio step size.

Certain embodiments of the invention may provide one or more technical advantages. Implementation of the transmit diversity systems embodying the present invention may provide one or more technical advantages, including, for example, optimizing transmit signal power, improving effectiveness of transmit diversity control, improving power consumption at the transmitting communication device by lowering power needed to transmit signals, improving wireless communication system capacity by reducing interference among wireless communication users, improving transmission efficiency by selecting optimal algorithms and parameters that will mitigate fading and improve beam-forming, and/or improving performance in other ways as a result of implementation of embodiments of the present invention.

In one embodiment of the present invention, a first communication device with a plurality of antenna elements, for example, a mobile device, may receive a quality-indication signal from a second communication device, for example, a base station. The first communication device may then apply phase changes to signals to be transmitted, which transmitted signals add up to the total power signal divided into two or more parts. These signals may be transmitted through the plurality of antennas. According to embodiments of the present invention, different changes in phase difference between two or more antennas, or phase steps, may be associated with different values of a mobility parameter. Phase changes may be applied, for example, until a desired combined signal is detected with desirably low power consumption.

In another embodiment of the present invention, a transmit signal may be adjusted using a change to the ratio of power, or a power ratio step, transmitted by the two or more antennas, instead of or in addition to a phase step. Different power ratio steps may be associated with different values of a mobility parameter. Power ratio changes may be applied, for example, until a desired combined signal is detected with desirably low power consumption.

In another embodiment of the present invention the desired transmit diversity control algorithm may be selected for the present conditions based on the value of a mobility parameter.

Another embodiment of the present invention may test power ratios different than the one being used, when the value of the mobility parameter indicates that the propagation path is stable (stationary or near stationary conditions). This embodiment may also apply to a mobile terminal using selective transmit diversity, i.e. transmission from a single antenna port that may be selected among two or more available antenna ports.

It will be recognized that embodiments of the invention may combine the above features into a single system, method or apparatus. It will further be recognized that the transmit diversity controls may be based on one mobility parameter, or more than one mobility parameter. In some embodiments of the invention, different transmit diversity controls may be based on respectively different mobility parameters.

Certain embodiments of the present invention may include none, some, or all of the above technical advantages. One or more other technical advantages may be readily apparent to one skilled in the art from the figures, descriptions, and claims included herein.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF EMBODIMENTS OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Embodiments of the present invention and its advantages are best understood by referring to FIGS. 1 through 19 of the drawings, like numerals being used for like and corresponding parts of the various drawings.

Figure 1:
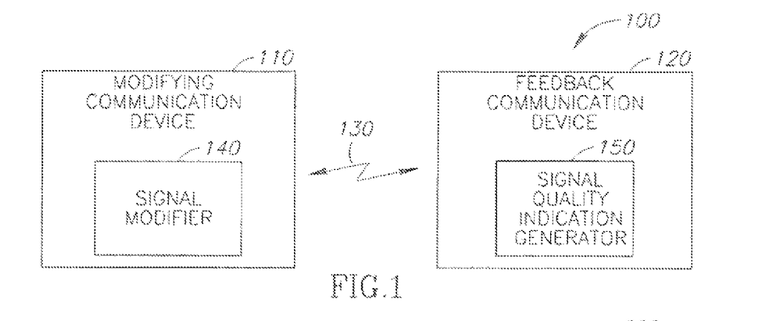
FIG. 1 is a schematic block diagram illustrating one embodiment of a communication system in accordance with the present invention.

FIG. 1 is a schematic block diagram illustrating one embodiment of a communication network 100 in accordance with the present invention that includes a transmitting and modifying communication device and a receiving and feedback communication device that communicate via a wireless link.

According to the illustrated embodiment, network 100 may operate to provide services such as communication sessions. A communication session may refer to an active communication between endpoints, measured from endpoint to endpoint. Information is communicated during a communication session. Information may refer to voice, data, text, audio, video, multimedia, control, signaling, other information, or any combination of the preceding.

The information may be communicated in packets. A packet may comprise a bundle of data organized in a specific way for transmission, and a frame may comprise the payload of one or more packets organized in a specific way for transmission. A packet-based communication protocol such as Internet Protocol (IP) may be used to communicate the packets. A packet may comprise any suitable packet, such as a General Packet Radio Service (GPRS) packet, an Enhanced Data for GSM Evolutions (EDGE) packet, or other suitable packet.

Network 100 may utilize communication protocols and technologies to provide the communication sessions. Examples of communication protocols and technologies include those set by the Institute of Electrical and Electronics Engineers, Inc. (IEEE) 802.xx standards, International Telecommunications Union (ITU-T) standards, European Telecommunications Standards Institute (ETSI) standards, Internet Engineering Task Force (IETF) standards, or other standards.

Devices of network 100 may use any suitable multiple access technology, for example, a code division multiple access (CDMA) technology. According to one embodiment, network 100 may operate according to a CDMA 2000 telecommunications technology that uses a single CDMA channel. As an example, a CDMA 2000 high rate data packet technology, such as the Evolution Data Only (EvDO) technology may be used.

Network 100 may comprise any suitable communication network. A communication network may comprise all or a portion of a public switched telephone network (PSTN), a public or private data network, a local area network (LAN), a metropolitan area network (MAN), a wide area network (WAN), a global computer network such as the Internet, a wireline or wireless network, a local, regional, or global communication network, an enterprise intranet, other suitable communication link, or any combination of the preceding.

A component of network 100 may include logic, an interface, memory, other component, or any suitable combination of the preceding. "Logic" may refer to hardware, software, other logic, or any suitable combination of the preceding. Certain logic may manage the operation of a device, and may comprise, for example, a processor. "Interface" may refer to logic of a device operable to receive input for the device, send output from the device, perform suitable processing of the input or output or both, or any combination of the preceding, and may comprise one or more ports, conversion software, or both. "Memory" may refer to logic operable to store and facilitate retrieval of information, and may comprise a Random Access Memory (RAM), a Read Only Memory (ROM), a magnetic drive, a disk drive, a Compact Disk (CD) drive, a Digital Video Disk (DVD) drive, a removable media storage, any other suitable data storage medium, or a combination of any of the preceding.

Communication network 100 includes one or more modifying communication devices 110 and one or more feedback communication devices 120 that communicate via a wireless link 130. Either or both of communication devices 110 or 120 may be any device operable to communicate information via signals with one or more other communication devices. For example, communication device 110 or 120 may comprise a subscriber unit or a base station. A subscriber unit may comprise any device operable to communicate with a base station, for example, a personal digital assistant, a cellular telephone, a mobile handset, a computer, or any other device suitable for communicating signals to and from a base station. A subscriber unit may support, for example, Session Initiation Protocol (SIP), Internet Protocol (IP), or any other suitable communication protocol.

A base station provides a subscriber unit access to a communication network that allows the subscriber unit to communicate with other networks or devices. A base station typically includes a base transceiver station and a base station controller. The base transceiver station communicates signals to and from one or more subscriber units. The base station controller manages the operation of the base transceiver station.

Either or both of communication devices 110 or 120 may include one or more antenna elements, where each antenna element is operable to receive, transmit, or both receive and transmit a signal. Multiple antenna elements may provide for a separation process known as spatial filtering, which may enhance spectral efficiency, allowing for more users to be served simultaneously over a given frequency band.

A communication link between communication devices 110 and 120 such as wireless link 130 may be a radio frequency link that is cellular in network organization. Wireless link 130 may be used to communicate a signal between communication devices 110 and 120.

As described more fully below, according to embodiments of the present invention, modifying communication device 110 may include a signal modifier 140 that modifies one or more signals. Signal modifier 140 may then modify the transmit signal in accordance with selection of phase, power, or both diversity parameters.

According to one embodiment of the invention, modifying a signal may refer to modifying a signal feature. A transmission signal feature, or in some embodiments of the invention, a transmit diversity parameter, may refer without limitation to any feature of the transmission, for example, relative phase, relative amplitude, relative power, absolute power, frequency, timing, other suitable signal feature that may be modulated, or any combination of the preceding. Relative phase may refer to the phase difference between the phase of a first signal of a first transmit antenna element and the phase of a second signal of a second transmit antenna element. Relative power may refer to the ratio between the power of a first signal of a first transmit antenna element and the power of a second signal of a second transmit antenna element, which ratio may be defined on a linear or logarithmic scale. Relative amplitude may refer to the ratio between the amplitude of a first signal of a first transmit antenna element and the amplitude of a second signal of a second transmit antenna element. Absolute power may refer to the total power transmitted by all antennas of modifying communication device 110. According to one embodiment, modifying a signal may be described as adjusting a nominal value of a transmit diversity parameter. As described more fully herein, according to an embodiment of the invention, adjustment of a transmit diversity parameter may comprise selecting phase diversity parameters, selecting power diversity parameters, or both.

A modifying communication device 110 calculates transmit diversity parameters for use in transmitting across wireless link 130. Modifying communications device 110 may modify transmit diversity parameters for transmission to receiving communication device 120 using phase diversity parameters, power diversity parameters, or both.

In some embodiments of the device, modifying communication device 110 may include a transmit signal control and a signal modifier. Quality indication generator 150 may generate parameters used for controlling transmit diversity of modifying communication device 110. The parameters may be generated by any suitable manner, for example, based on feedback from the receiving communication device 120, actual environmental conditions at the modifying communication device 110, one or more performance parameters measured at modifying communication device 110, or other indications. Signal modifier 140 may modify a pre-transmission signal in accordance with one or more transmit diversity parameters obtained from quality indication generator 150.

Alterations or permutations such as modifications, additions, or omissions may be made to communication network 100 without departing from the scope of the invention. Additionally, operations of communication network 100 may be performed using any suitable logic comprising software, hardware, other logic, or any suitable combination of the preceding.

In one embodiment of the present invention, one or more mobility parameters may be based on power control signals. These signals may be power control commands that may be transmitted by a base station and may be received by a terminal. The signal may include a command to increase or reduce transmitted power of a mobile station. During some transmission conditions that may allow for stable propagation conditions, a variation in pilot channel power that the mobile terminal may be required to control may be small. In other conditions, for example when propagation conditions may become less stable, a transmission condition, for example, a path loss between a base station and a mobile terminal may become highly variable. In this case, the uplink power control may reflect this variation by requesting a larger change in a mobile transmit power.

In an embodiment of the present invention, mobility parameters may be based on a detection of a received power level mobility on the downlink. A mobile terminal may detect transmission of one or multiple base stations. When the propagation conditions between the mobile terminal and a base station are stable, a detected power level at the mobile terminal from the base station may be relatively stable. When the dynamics of the propagation increase, a rate of change of a received power level may increase.

An embodiment of the present invention may base mobility detection on actual feedback from a base station, and may indicate a change in conditions. A base station may measure a signal level from a mobile terminal, and may determine, from multiple measurements over time, a variability of an uplink propagation path. A base station may send to a mobile terminal, either as part of a standard, if allowed, or as a higher level message, an indication of variability level of a propagation path.

According to an embodiment of the present invention, a modifying communication device 110 adjusts a nominal value of a transmit diversity parameter and applies changes to a signal transmitted to feedback communication device 120. Feedback communication device 120 returns feedback that describes the power of the signal.

According to some embodiments described herein, modifying communication device 110 may compute a diversity parameter that may be used to control the power, phase, or both, of transmit diversity for a signal transmitted from communication device 110 to receiving communication device 120. Modifying communication device 110 may adjust a nominal value of transmit diversity parameter based on the adjustment of the phase, power, or both parameters. This may enhance the system throughput, by requiring less repetitions or supporting higher data rate and larger, more efficient data packets.

Embodiments of the present invention may allow for a system with reduced power consumption by providing control of the power ratio, or relative amplitude, the relative phase, or both, of output signals. Embodiments of the present invention may allow for improvement of power efficiency, optimized received signal quality, or both, by maintaining high radio frequency (RF) linearity through an air interface with a defined power range. Embodiments of the invention may provide for improved performance, measured, for example, in terms of the power the unit is required to transmit for the receiver to receive acceptable signal quality, the number of errors in the transmission, higher throughput and improved coverage resulting from possibly improved selection of diversity control parameters.

Additional embodiments of the present invention may include any combination of any of these embodiments, and may allow for the determination of additional mobility parameters.

Figure 2:
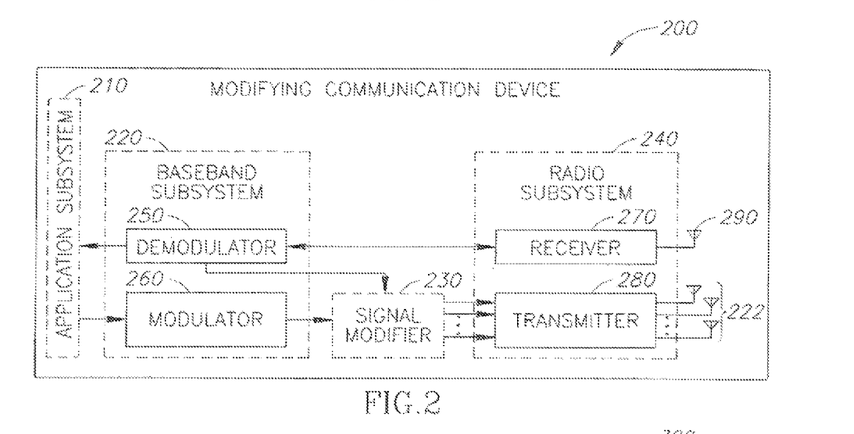
FIG. 2 is a block diagram illustrating one embodiment of a modifying communication device in accordance with the present invention that may be used with the network of FIG. 1.

FIG. 2 is a block diagram illustrating one embodiment of a modifying communication device 200, which is referred to as 110 in FIG. 1 that may be used with network system 100 of FIG. 1 in accordance with the present invention.

Modifying communication device 200 may comprise, for example, a mobile subscriber unit. Modifying communication device 200 may include an application subsystem 210, a baseband subsystem 220, a signal modifier 230, a radio subsystem 240, a receive antenna 290, and a plurality of transmit antennas 222 coupled as shown. It will be understood that in some embodiments of the invention, one or more of the transmit antennas may serve as a receive antenna. Baseband subsystem 220 includes a demodulator 250 and a modulator 260, and radio subsystem 240 includes a receiver 270 and a transmitter 280. According to one embodiment of operation, a receive signal passes through receive antenna 290, receiver 270, demodulator 250, and application subsystem 210. Generally, a transmit signal may pass from application subsystem 210, be modulated by modulator 260, be modified by signal modifier 230, for example, divided into a plurality of signals, which may be converted to radio frequency signals at transmitter 280, and be transmitted by transmit antennas 222.

Application subsystem 210 processes receive signals to extract information communicated in the receive signals, and processes transmit signals for transmission to communicate information. Baseband subsystem 220 performs baseband signal processing. Modulator 260 modulates signals, and demodulator 230 demodulates signals and extracts quality indicators from signals.

According to one embodiment, baseband subsystem 220 generates a control signal that controls the transmission power of modifying communication device 200. Any other suitable component of modifying communication device 200, however, may generate the control signal. A control signal may instruct modifying communication device 200 to increase or decrease the transmission power in accordance with feedback from feedback communication device 120 of FIG. 1.

Signal modifier 230 modulates one or more of signals to yield one or more modified signals, each of which may be transmitted by an element of transmit antennas 222. The signals may be modified to increase constructive interference or reduce destructive interference. Signal modifier 230 may include control logic that controls the operation of signal modifier 230.

A modification may refer to one or more adjustments of one or more modulation features of a signal. A modulation feature refers to a feature of a signal that may be modulated, for example, a phase, amplitude, frequency, timing, other suitable modulation feature, or any combination of the preceding. According to one embodiment, a modification may be described as the application of a diversity parameter, where a diversity parameter represents a modulation feature between signals transmitted on two or more transmit antennas. According to the embodiment, adjusting a modulation feature may be described as applying a diversity parameter representing the modulation feature.

Signal modifier 230 may modify signals to adjust the power balance between transmitted signals in order to improve the effectiveness of transmit diversity. Phase adjustment typically has a greater effect on the efficiency of transmit diversity than amplitude adjustment, but amplitude adjustment may improve transmit diversity gain and transmit power efficiency. According to one embodiment, the phase and amplitude may be adjusted during alternate duty cycles. According to the embodiment, the duty cycle may be selected such that the phase is adjusted more than the amplitude is adjusted. The duty cycle may be constant or varied.

According to one embodiment, signal modifier 230 may adjust the amplitude by maintaining a predetermined total power and changing the relative power between antennas 222. The relative power between antennas 222 may be changed by increasing the difference between power levels fed into antenna ports of antennas 222.

According to one embodiment, measurements from a base station may be used to control the relative power. According to the embodiment, each transmit path may be separately activated for a short duration in an alternating fashion, for example, a first antenna may transmit while the second antenna is idle, and the second antenna may transmit while the first antenna is idle. According to one embodiment, feedback from the base station indicates the relative strength of each transmit path separately. According to another embodiment, the feedback indicates the differences in the relative strengths. The process may be repeated to achieve a desired accuracy.

Radio subsystem 240 performs radio frequency signal processing. Receiver 270 receives signals from receive antenna 290, and transmitter 280 sends signals to one or more transmit antennas 222. Radio subsystem 240 may include a duplexer/diplexer that separates different bands such as cellular service from Personal Communication Service (PCS) bands, receive from transmit bands, or both. Receive antenna 290 receives signals and may have one or more antenna elements. Transmit antennas 222 transmit signals and may have one or more antenna elements, where each antenna element transmits a transmit signal.

Modifications, additions, or omissions may be made to modifying communication device 200 without departing from the scope of the invention. For example, communication device 200 may have more, fewer, or other modules. Moreover, the operations of communication device 200 may be performed by more, fewer, or other modules. Additionally, operations of communication device 200 may be performed using any suitable logic comprising software, hardware, other logic, or any suitable combination of the preceding.

Figure 3:
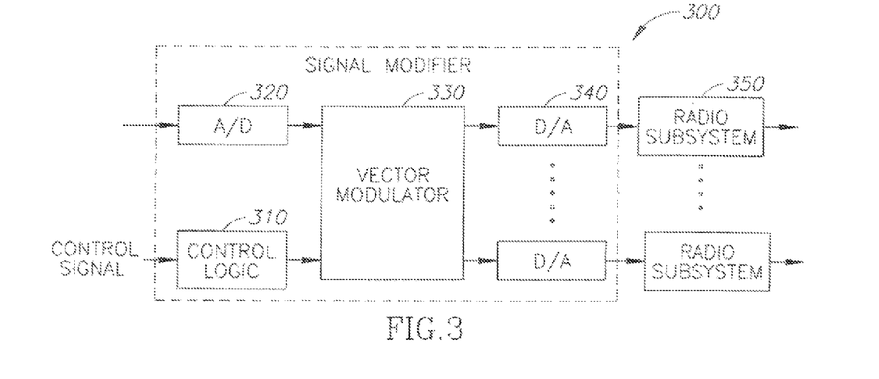
FIG. 3 is a block diagram illustrating one embodiment of a signal modifier in accordance with the present invention that may be used with the modifying communication device FIG. 2.

FIG. 3 is a block diagram illustrating one embodiment in accordance with the present invention of a signal modifier 230 of FIG. 2 that may be used with any suitable communication device 110 of FIG. 1, such as communication device 200 of FIG. 2. Signal modifier 300 includes control logic 310, one or more analog-to-digital (A/D) converters 320, a vector modulator 330, and one or more digital-to-analog (D/A) converters 340 coupled as shown. D/A converters 340 are coupled as shown to one or more radio subsystems 350, which are referred to as 240 in FIG. 2. A D/A converter 340 and a radio subsystem 350 may be associated with an antenna element 222 of FIG. 2.

According to the illustrated embodiment, signal modifier 300 receives a signal. A/D converter 320 converts the signal from an analog form to a digital form and forwards the signal to vector modulator 330. Control logic 310 receives a control signal and establishes signal parameter adjustments in accordance with the control signal. The value of the mobility parameter may be calculated by control logic 310. Control logic 310 provides to vector modulator 330 instructions for performing the modification according to the signal parameter adjustments.

According to one embodiment, control logic 310 provides complex weighting values to vector modulator 330. The complex weighting may be calculated by determining the appropriate weighting value associated with the in-phase signal component and the quadrature signal component for an antenna element. As an example, if the phase is being adjusted, the weighting value for the in-phase signal component may be different from the weighting value for the quadrature signal component. The complex weighting may be based on the mobility parameter of the transmitted signal, which, in turn, may be used to determine the relative phase rotation associated with each antenna element and/or the power ratio associated with each antenna element.

Vector modulator 330 splits the signal into multiple signals and applies the complex weighting to at least a subset of the signals to modify the subset of signals based on the complex weighting values. D/A converters 340 convert the signals to analog form. Radio subsystem 350, which is referred to as 240 in FIG. 2, converts the signals to a radio frequency. The signals may be forwarded to power amplifiers and respective antenna elements 222 of FIG. 2.

Modifications, additions, or omissions may be made to signal modifier 300 without departing from the scope of the invention. For example, signal modifier 300 may have more, fewer, or other modules. Moreover, the operations of signal modifier 300 may be performed by more, fewer, or other modules. Additionally, operations of signal modifier 300 may be performed using any suitable logic comprising software, hardware, other logic, or any suitable combination of the preceding.

Figure 4:
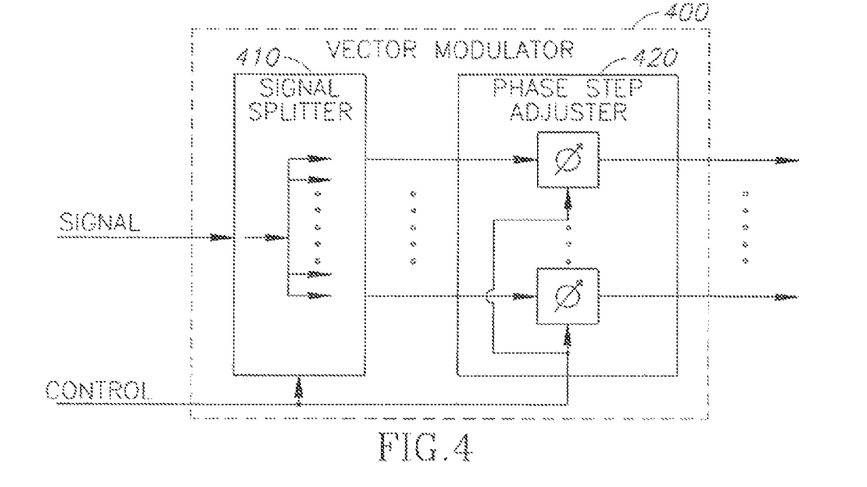
FIG. 4 is a block diagram illustrating a phase difference adjuster that may be used in a vector modulator in accordance with embodiments of the present invention, which may be used in a signal modifier such as depicted in FIG. 3.

FIG. 4 is a block diagram illustrating a phase difference adjuster 420 in an embodiment of a vector modulator 400, which may be used as module 330 in FIG. 3, and which may be used by the signal modifier 300 of FIG. 3. Phase difference adjuster 420 may produce a phase difference among two or more signals, for example, in accordance with a provided phase step, which may be provided by a control signal. As described herein, the phase step may be adjusted, for example, based on a mobility parameter. There may be at least two inputs to the vector modulator 400: a signal, which may be a digital signal, for example, an output of an A/D converter such as A/D converter 320 in FIG. 3, and a control, which may be an output of the control logic module 310 in FIG. 3. The control may serve as an input to a signal splitter 410, and a phase difference adjuster 420, which may produce an adjusted phase difference between the signals.

The signal from the A/D converter 320 of the signal modifier 300 may be fed into a signal splitter 410, which may divide the signal into two or more constituent parts to be processed separately. The split signal from the signal splitter 410 may be provided to phase difference adjuster(s) 420 for producing an adjusted phase difference between signals.

The output from control logic 310 of FIG. 3 may be also provided to the phase difference adjuster 420 for the calculation of the phase step adjustment. The output of the phase difference adjuster 420 is fed into the D/A converters 340 and radio subsystems 350 of the signal modifier 300 in FIG. 3 to be transmitted via the antennas 222 in FIG. 2.

This embodiment of a vector modulator 400 may address the phase adjustment step size of an algorithm such as described in U.S. patent application Ser. No. 11/592,969, filed Nov. 6, 2006, and entitled "Modifying A Signal By Controlling Transmit Diversity Parameters" and/or U.S. patent application Ser. No. 11/136,020, filed May 24, 2005 and entitled "Determining a Phase Adjustment in Accordance with Power Trends", the contents of which are incorporated by reference herein in their entirety. In an embodiment of the invention, a phase step may be associated, for example, with each of one or more values of the mobility parameter. A phase step may be, for example, the change in the nominal value of the phase as disclosed in the above U.S. patent application Ser. No. 11/592,969.

A mobility parameter, which may be denoted herein as MOBILITY, may have two or more values. When a mobility parameter has two values, for example 0 and 1, then a value of Phi1 degrees may be defined as an adjustment step size to be used if the mobility parameter MOBILITY equals 0, and Phi2 degrees may be defined as an adjustment step size to be used if the mobility parameter MOBILITY equals 1. When the mobility parameter has more than two possible values, a phase step adjustment may be associated with each value or each range of values. It will be recognized that in some embodiments of the invention, the same phase step adjustments may be associated with different mobility parameter values, for example, according to a general function:

PHASE STEP=function(MOBILITY)

In a more general case, a phase step PS(k+1), may take into consideration a previous one or more phase steps, for example, phase step PS(k) and/or m previous phase step values, as well as the present value of the mobility parameter, MOBILITY(k) and/or n previous values of the mobility parameter. In this case, for example, the function may be described as:

PS(k+1)=function{MOBILITY(k, k−1, ..., k−n), PS(k, k−1, ..., k−m)}

This embodiment may be applied in a similar way to other phase-related parameters of transmit diversity control and/or other algorithms, such as phase offset, which may be the phase perturbation as described in U.S. patent application Ser. No. 11/592,969.

Figure 5:
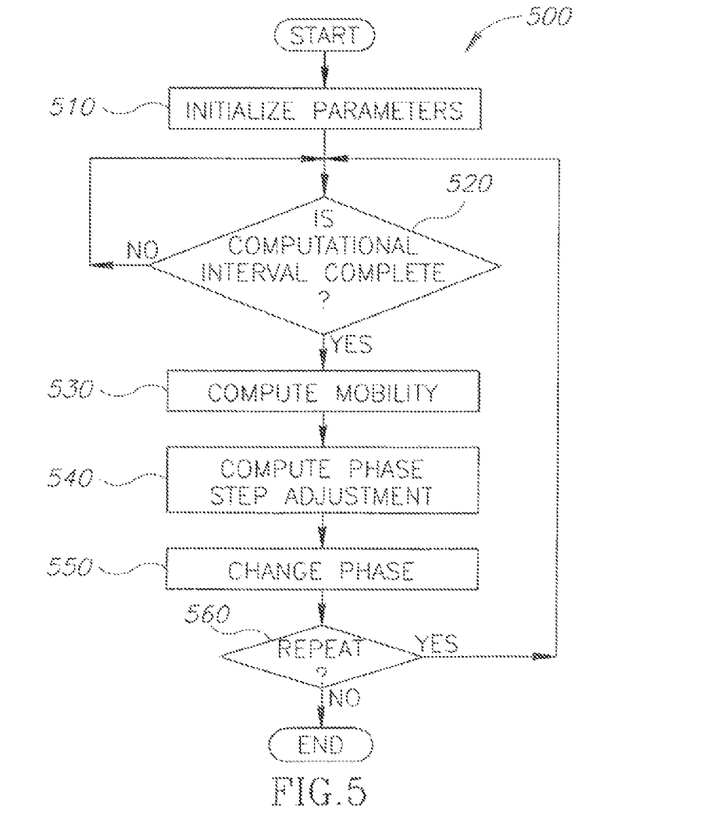
FIG. 5 is a flowchart illustrating one embodiment of a method for determining phase step adjustment based on the value of a mobility parameter in accordance with the present invention.

FIG. 5 is a flowchart illustrating one embodiment of a method for determining phase step adjustment based on the value of the mobility parameter that may be used by signal modifier of 300 of FIG. 3, and which corresponds to a phase difference adjuster 420 embodiment in FIG. 4 of a vector modulator 330 of FIG. 3.

The method 500 begins at step 510, where parameters are initialized. In step 520 it is determined whether it is time to compute new parameter values, in accordance with the present value of the computation interval. The present interval may be set to a constant value or may be variably set to different values. In step 530 mobility parameter values are computed. In step 540 phase step adjustments are computed. This current phase adjustment may then be applied to one or more signals to yield one or more modified signals in step 550. A decision is made in step 560 whether to continue the computational cycle or stop the iterations and remain in the current state.

Figure 6:
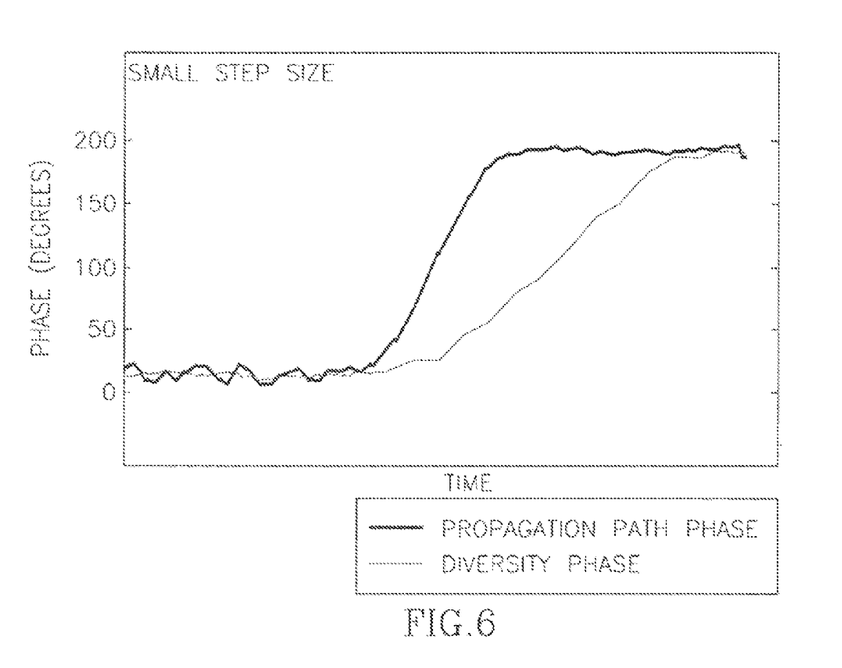
FIG. 6 is a schematic graph illustrating operation of an transmit diversity apparatus using a low mobility algorithm according to embodiments of the invention.
Figure 7:
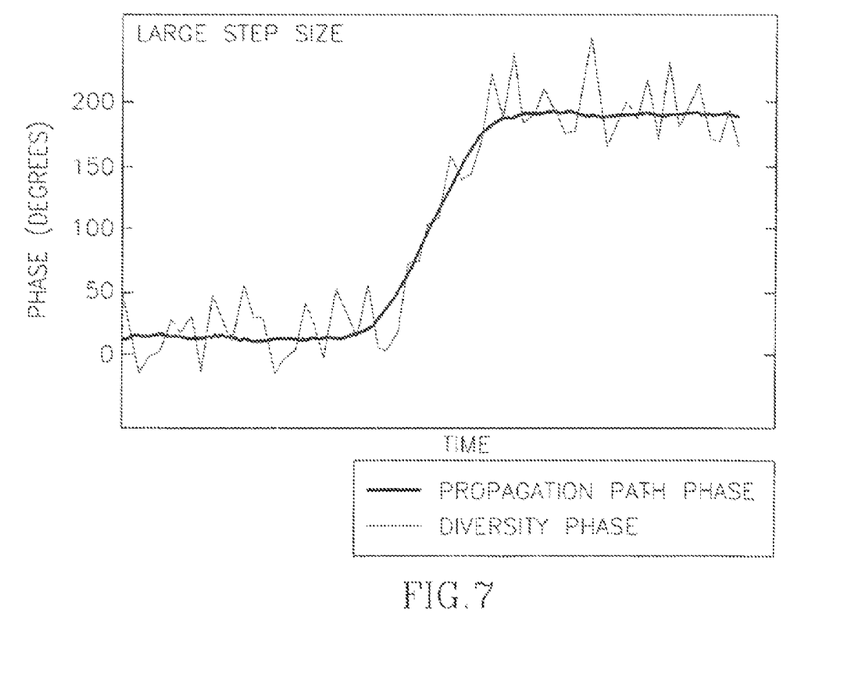
FIG. 7 is a schematic graph illustrating operation of an transmit diversity apparatus using a high mobility algorithm according to embodiments of the invention.
Figure 8:
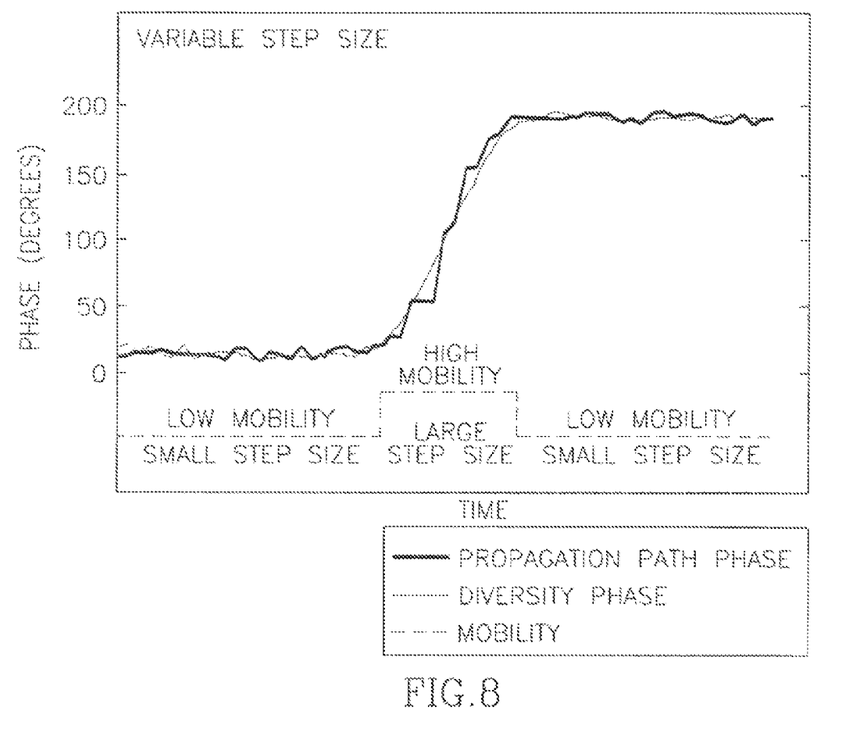
FIG. 8 is a schematic graph illustrating operation of an transmit diversity apparatus using a combination of a low mobility algorithm and a high mobility algorithm according to embodiments of the invention.

FIGS. 6 through 8 show an example illustration of the operation of an apparatus such as described in FIGS. 1 through 4 and/or of the application of a method as depicted in FIG. 5. Without mobility detection, a phase adjustment step size may have a fixed value. For small step sizes the phase adjustment algorithm may not be capable of tracking the phase of a rapidly varying propagation path (FIG. 6). Large step sizes produce large residual error when the environment is stable (FIG. 7). By using mobility detection, the step size may optimally be adjusted according to the value of a mobility parameter, where the phase adjustment step size may be small for stable conditions and large when there is higher mobility (FIG. 8).

Figure 9:
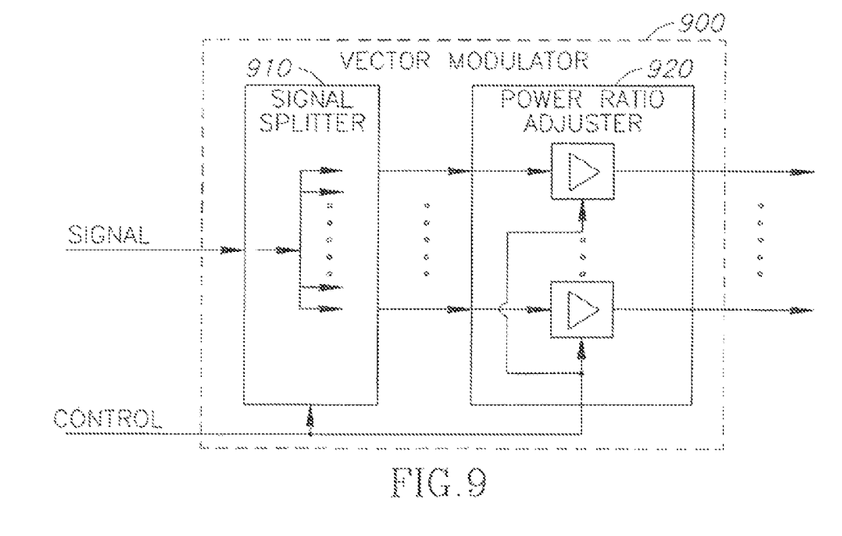
FIG. 9 is a block diagram illustrating a power ratio adjuster that may be used in a vector modulator in accordance with embodiments of the present invention, which may be used in a signal modifier such as depicted in FIG. 3.

FIG. 9 is a block diagram illustrating a power ratio adjuster 920 embodiment of a vector modulator 900, which has been referred to as module 330 in FIG. 3, and which may be used by the signal modifier 300 of FIG. 3. Power ratio adjuster 920 may produce a power ratio among two or more signals, for example, in accordance with a provided power ratio step, which may be provided by a control signal. As described herein, the phase step may be adjusted, for example, based on a mobility parameter. There may be two inputs to the vector modulator 900: a signal, which may come out of the A/D converter 320 in FIG. 3, and a control, which may be an output of control logic module 310 in FIG. 3. The control may serve as an input to a signal splitter 910, and power ratio adjuster 920.

The signal from the A/D converter 320 of the signal modifier 300 may be fed into a signal splitter 910, which may divide the signal into two or more constituent parts to be processed separately. The split signal from the signal splitter 910 may be fed into power ratio adjuster(s) 920.

The output from control logic 310 of FIG. 3 may be also provided to the power ratio adjuster 920 for providing a power ratio step between the signals. The output of the power ratio adjuster 920 is fed into the D/A converters 340 and radio subsystems 350 of the signal modifier 300 in FIG. 3 to be transmitted via the antennas 222 in FIG. 2.

This embodiment of a vector modulator 900 addresses the power ratio adjustment step size of an algorithm such as defined in application U.S. patent application Ser. No. 11/136,017 filed May 24, 2005 and entitled "Modifying A Signal By Adjusting The Phase And The Amplitude Of The Signal", the contents of which are herein incorporated by reference in their entirety. In this embodiment, a power ratio step is associated with each value of the mobility parameter.

When a mobility parameter has two values, for example 0 and 1, then a value of PR1 may be defined as a power ratio adjustment to be used if the mobility parameter MOBILITY equals 0, and PR2 may be defined as a power ratio adjustment to be used if the mobility parameter MOBILITY equals 1. When the mobility parameter has more than two possible values, a power ratio adjustment may be associated with each value or each range of values. It will be recognized that in some embodiments of the invention, the same power ratio adjustments may be associated with different mobility parameter values. Power ratio adjustment may be defined on a logarithmic scale. If the relative power of output n (out of the total transmit power) during time k is be defined as a(k), then its equivalent logarithmic value may be defined in dB as:

$$A(k)=10*\log 10(a(k)), \text{ where } A(k) \leq 0.$$

In some embodiments of the invention, the adjustment to the power ratio may depend only on MOBILITY, for example:

$$A(k+1)=\min\{A(k)+fp(\text{MOBILITY}), 0\},$$

where k+1 is the index of value after adjustment, k is the present index of value before adjustment, fp is the function used to determine the adjustment per the mobility parameter value, with the maximum value limited to 0 dB when total power is transmitted from one antenna.

In some embodiments of the invention, the power ratio adjustment may also depend on any function of MOBILITY and the present value of the ratio, for example:

$$A(k+1)=fp\{(\text{MOBILITY}), A(k)\}.$$

In some embodiments of the invention, the power ratio adjustment may depend on the present and previous values with memory of n additional values for MOBILITY and/or m additional values for the ratio:

$$A(k+1)=fp\{\text{MOBILITY}(k, k-1, \ldots, k-n), A(k, k-1, \ldots, k-m)\}$$

Power ratio may also be defined as the ratio of outputs, for example when there are only two outputs with relative powers a and b, the ratio may be defined as $$r(k)=a(k)/b(k)$$

and on a logarithmic scale $$R(K)=A(k)-B(k)$$

In this case R(k) may have any positive or negative value (any real number), and in the most general case, using the present and n previous values for MOBILITY and the present and m previous values for the ratio, the next ratio in dB may be:

$$R(k+1)=fp\{\text{MOBILITY}(k, k-1, \ldots, k-n), R(k, k-1, \ldots, k-m)\}$$

Figures 10, 11:
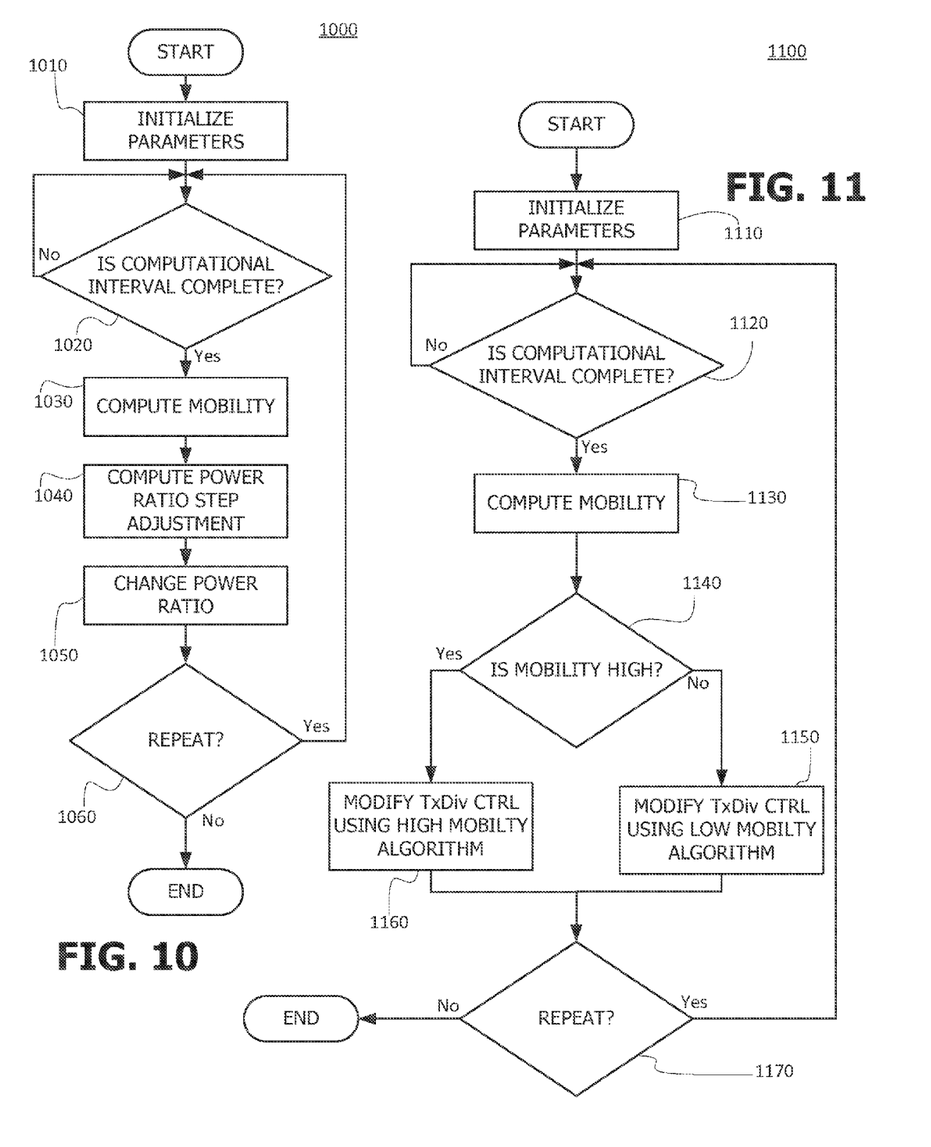
FIG. 10 is a flowchart illustrating one embodiment of a method for determining power ratio step adjustment based on the value of a mobility parameter in accordance with the present invention.
FIG. 11 is a flowchart illustrating one embodiment of a method in accordance with the present invention for selecting a transmit diversity control algorithm to be used by a signal modifier.

FIG. 10 is a flowchart illustrating one embodiment of a method for determining power ratio step adjustment based on the value of the mobility parameter that may be used by signal modifier of 300 of FIG. 3, and which corresponds to a power ratio adjuster 920 embodiment in FIG. 9 of a vector modulator 330 of FIG. 3.

The method 1000 begins at step 1010, where parameters are initialized. In step 1020 it is determined whether it is time to compute new parameter values, in accordance with the present value of the computation interval. The present interval may be set to a constant value or may be variably set to different values. In step 1030 mobility parameter values are computed. In step 1040 power ratio step adjustments are computed. This current power ratio adjustment may then be applied to a signal to yield a modified signal in step 1050. A decision is made in step 1060 whether to continue the computational cycle or stop the iterations and remain in the current state.

It will be recognized that the methods and apparatus of FIG. 4 and FIG. 5 may be combined with those of FIG. 9 and FIG. 10 to give an embodiment of a vector modulator 330 in FIG. 3, which may use a combination of phase step and power ratio adjustments. Such embodiments may apply either phase step adjustment, power ratio adjustment, or both phase step adjustment and power ratio adjustment in proportions determined by a mobility parameter.

FIG. 11 is a flowchart illustrating one embodiment of a method for determining which transmit diversity control algorithm is selected for the present conditions to be used by the signal modifier of FIG. 3. In this embodiment, a mobility parameter may be used to select a transmit diversity control algorithm based on the present conditions. Some transmit diversity control algorithms may provide better performance when the propagation path conditions are stable, while other such algorithms may provide better performance when the conditions are changing quickly.

For example, referring to U.S. patent application Ser. No. 11/592,969, modifying the nominal phase as soon as the air interface allows, after a new uplink power control indication becomes available in the mobile terminal, may provide better performance when the propagation conditions are changing quickly (high mobility); whereas when mobility is low, indicating slow changing propagation conditions, it may be preferable to modify this nominal phase every several slots per a different fractional rate algorithm as described in U.S. patent application Ser. No. 11/592,969 or applying the algorithm described in U.S. patent application Ser. No. 11/136,020 to provide better performance. A high mobility transmit diversity control algorithm may be, for example, a phase difference perturbation or another algorithm as described in U.S. patent application Ser. No. 11/592,969, in which the transmit diversity parameter may be heavily influenced by recent changes in signal quality. A low mobility transmit diversity control algorithm may be, for example, a window algorithm, for example, as described in U.S. patent application Ser. No. 11/645,534, in which the transmit diversity parameter may be heavily influenced by a number of signal quality measurements.

The method 1100 begins at step 1110, where parameters are initialized. In step 1120 it is determined whether it is time to compute new parameter values, in accordance with the present value of the computation interval. The present interval may be set to a constant value or may be variably set to different values. In step 1130 mobility parameter values are computed. In step 1140 a decision is made as to the value of the mobility parameter. If the mobility parameter value is low, then proceed to step 1150. However, if the mobility parameter value is high, then proceed to step 1160. It will be recognized that high and low may mean higher or lower than a defined threshold value. A decision is made in step 1170 whether to continue the computational cycle or stop the iterations and remain in the current state.

Figure 12:
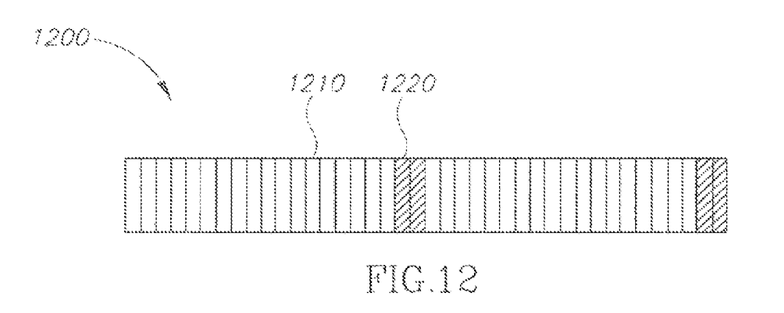
FIG. 12 is a diagram illustrating a low duty cycle test of antenna selection in one embodiment of a power ratio probing scheme in accordance with the present invention.

FIG. 12 illustrates an embodiment of a power ratio probing scheme, which may test power ratios different than the one being used, when the value of the mobility parameter indicates that the propagation path may be stable (stationary or near stationary conditions). Since the relative propagation path loss from different antennas varies widely when the mobile terminal moves, the time required to determine the optimal ratio may be longer than the time until this optimal ratio changed significantly.

When the mobility parameter value indicates that conditions are relatively stationary, then probing for a different power ratio may become valuable. Transmission may be activated with a different power ratio for a relatively short time, for example during 1 or 2 slots out of every 10 to 20 slots, as shown in FIG. 12. The ratio probing scheme 1200 shows a longer sequence of slots 1210 where the presently preferred ratio is used, followed by 2 slots 1220 when a different probed ratio is applied.

The system responses, i.e., the uplink power control corresponding to the slots when this different power ratio is transmitted, as well as the system response in the slots immediately following the slots when this different power ratio is transmitted, provide a statistical indication of whether this proving power ratio is better or worse than the one being used for the majority of the slots. If the statistics of the uplink power control during the probing slots indicate power up, the present ratio is better; then a probing ratio may be transmitted in the opposite direction as explained below. If the statistics of the uplink power control during the probing slots indicate power down, it means the probing ratio is better and it may be applied to the majority of the slots.

If the probing ratio is worse than the one being used for the majority of the slots, then a new probing ratio may be defined in the opposite direction using the above definitions. In this case the new probing ratio R2 may be defined from the main ratio R and previous probing ratio R1 as:

$$R2=R-k*\text{sign}(R1-R),$$

where k is some factor that may be constant but preferably is a function of R so the rate of change is not constant but may be adapted to any scale.

This relation may be generalized as:

$$R2=R-s*k(s,R)*\text{sign}(R1-R),$$

where s is 1 if the probing ratio was unsuccessful and −1 if the probing ratio was successful. k(s, R) now allows for dependency on both the success and the present ratio.

Figure 13:
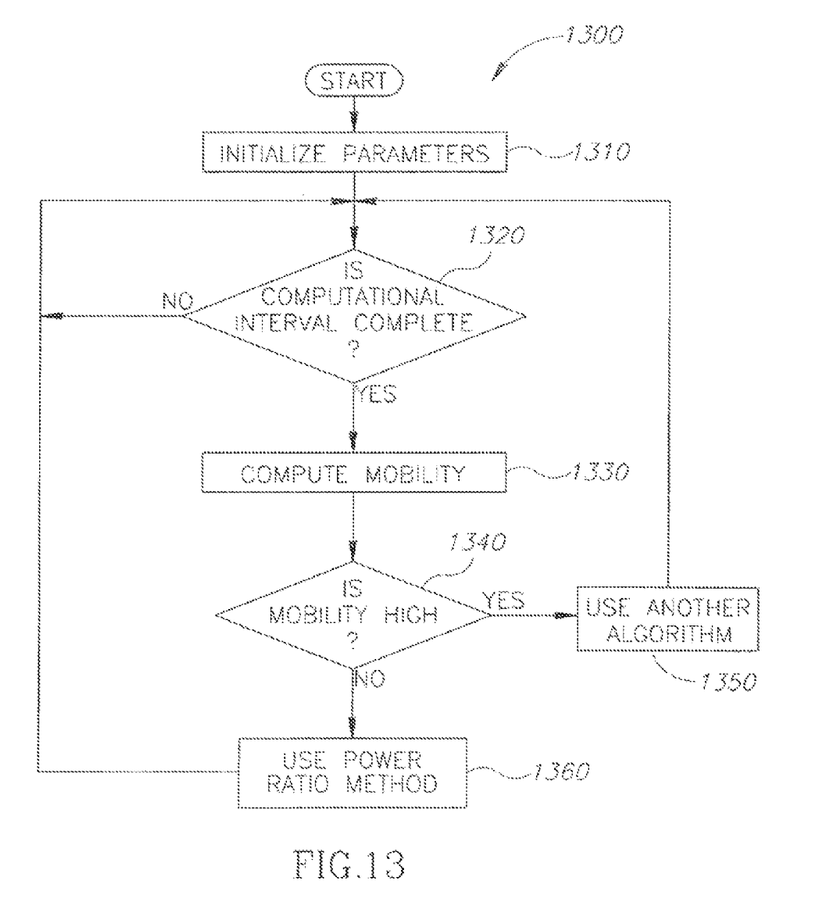
FIG. 13 is a flowchart illustrating one embodiment of a method in accordance with the present invention for determining a power ratio to be used by a signal modifier when the propagation path is stable.

FIG. 13 is a flowchart illustrating one embodiment of a method in accordance with the present invention for selecting an algorithm to be used by a signal modifier. FIG. 13 illustrates the steps taken in connection with the illustration of FIG. 12. The method 1300 begins at step 1310, where parameters are initialized. In step 1320 it is determined whether it is time to compute new parameter values, in accordance with the present value of the computation interval. The present interval may be set to a constant value or may be variably set to different values. In step 1330 mobility parameter values are computed. In step 1340 a decision is made as to the value of the mobility parameter. If the mobility parameter value is high, then proceed to step 1350, trying a different algorithm. However, if the mobility parameter value is low, then proceed to step 1360 and use the power ratio method.

Figure 14:
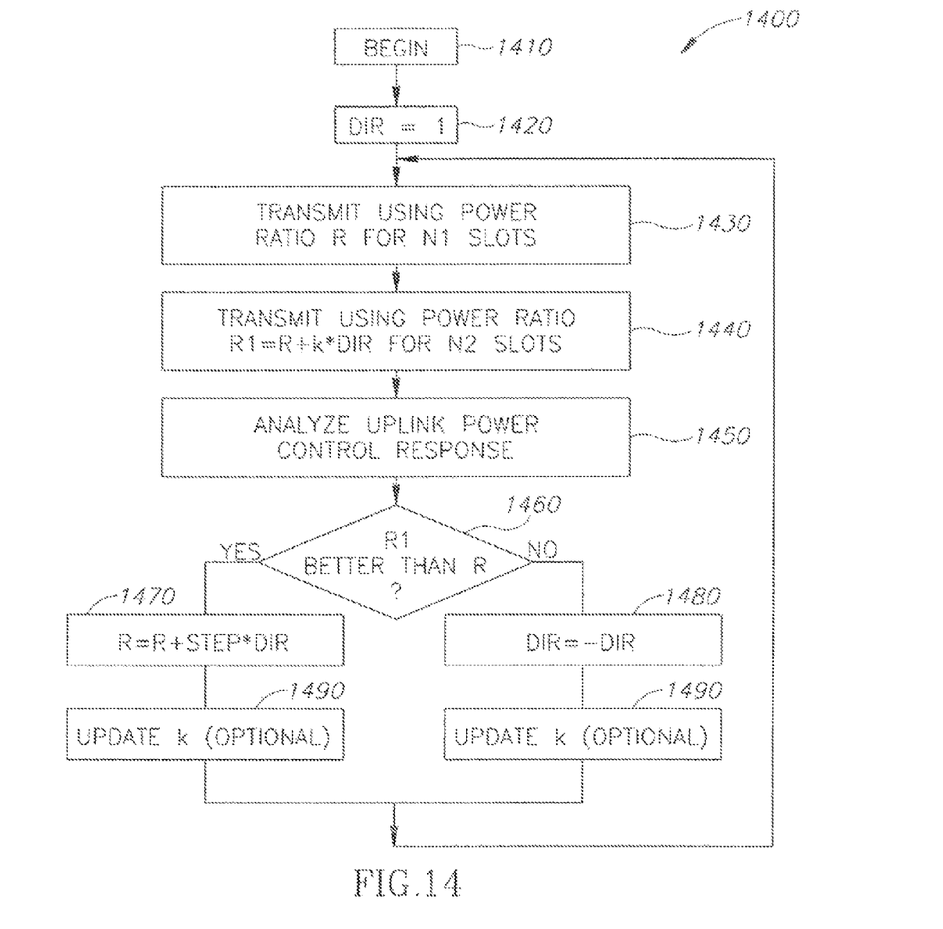
FIG. 14 is a flowchart illustrating one embodiment of a power ratio adjustment method according to embodiments of the present invention.

FIG. 14 is a flowchart illustrating one embodiment of power ratio adjustment method according to embodiments of the present invention. FIG. 14 further illustrates the method of FIG. 12. The method 1400 begins at step 1410, and the direction of the power ratio change is set to 1 in step 1420. Then a transmission is made using the power ratio R for N1 slots in step 1430. After that, a transmission using power ratio R1=R+k*DIR is made in step 1440. Uplink power control response is analyzed in step 1450. A decision is made in step 1460 as to whether R1 is better than R. If R1 is better than R, then R=R+STEP*DIR in step 1470, after which an optional update of k may take place in step 1490. If R1 is NOT better than R, then in step 1480 the direction is reversed, and k may be optionally updated in step 1490.

Figure 15:
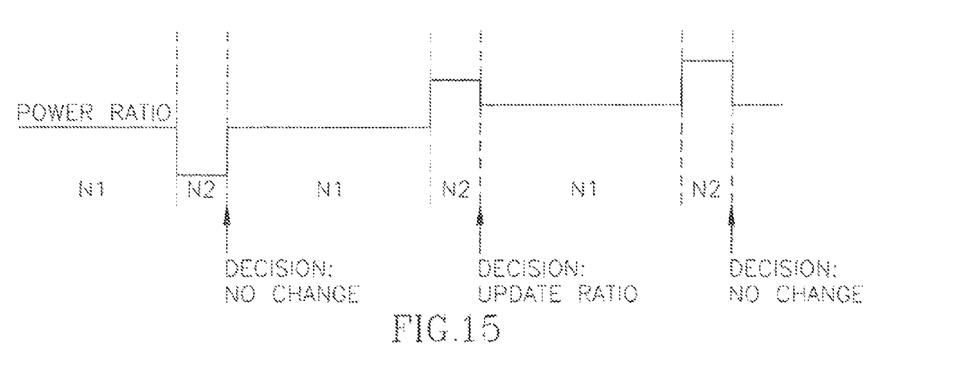
FIG. 15 is a timing diagram example corresponding to a method of the present invention, such as depicted in FIG. 14.

FIG. 15 is a timing diagram example corresponding to FIG. 14. Possible values for the method parameters may be, for example, N2=2 slots, STEP=k/2, and N1 may be determined according to the value of the mobility parameter.

Figure 16:
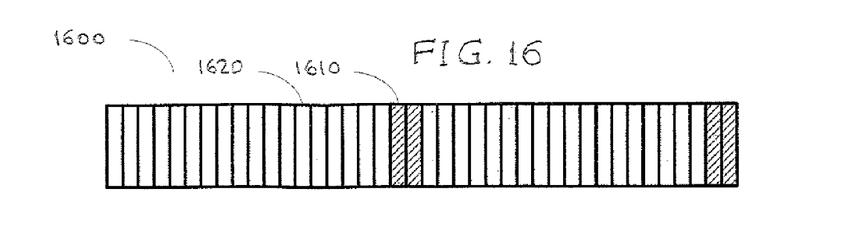
FIG. 16 is a diagram illustrating a low duty cycle test of antenna selection in a mobile terminal using selective transmit diversity in accordance with the present invention.

FIG. 16 illustrates an embodiment of a low duty cycle test of antenna selection, and is similar to the embodiment of FIG. 12. This embodiment also applies to a mobile terminal using selective transmit diversity, for example a transmission from a single antenna port that may be selected among two or more available antenna ports. FIG. 16 shows allocation 1600 of a short transmission time 1610 to the antenna that is not presently used (the secondary antenna), for example by transmitting during 1 or 2 slots (shown with the pattern) out of every 10 to 20 slots where most slots 1620 are transmitted out of the other antenna (the primary antenna). The mobile then analyzes the uplink power control response to this test, for example whether the system response (uplink reverse control) is mostly "power up" or "power down". The former indicates the signal received by the base station when this secondary antenna is transmitting, is weaker; therefore the primary antenna should be preferred. The latter indicates the reception of transmissions from the secondary antenna is better, therefore the antennas should be switched—the secondary antenna becoming the new primary one and vice versa. Switching decision may prefer the better antenna, or it may use a hysteresis threshold value so that switching may be carried out after the secondary antenna proves better than the first antenna by a certain power gain, for example 3 dB, or as determined over a certain number of past slots, for example, over the past 80 slots, or over a certain time period, for example, 100 msec, or any combination using single or multiple thresholds.

Figure 17:
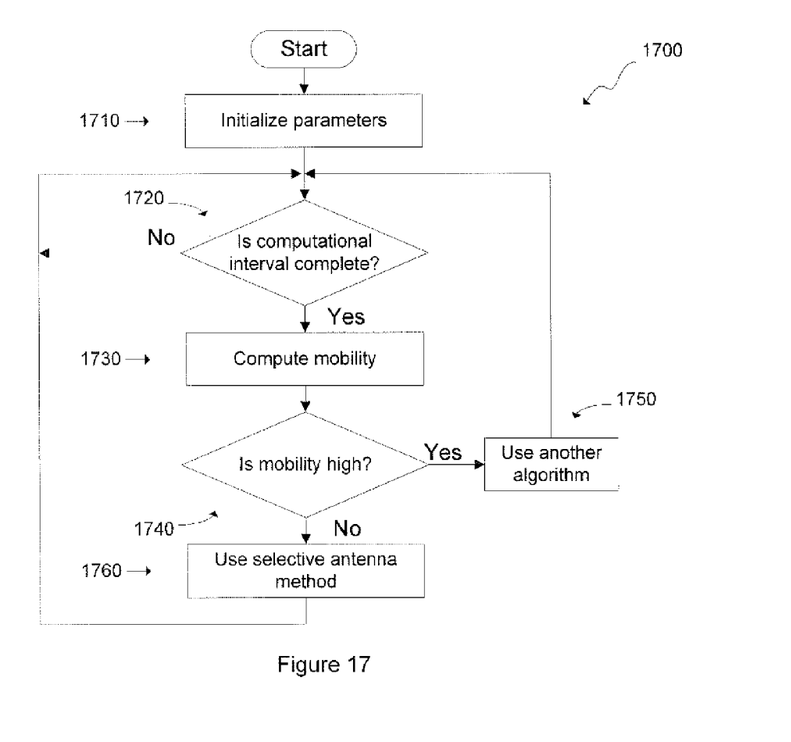
FIG. 17 is a flowchart illustrating one embodiment of a method in accordance with the present invention for selecting a single antenna port among two or more available antenna ports.

FIG. 17 is a flowchart illustrating one embodiment of a method in accordance with the present invention for selecting a single antenna port among two or more available antenna ports. FIG. 17 illustrates the steps taken in connection with the illustration of FIG. 16. The method 1700 begins at step 1710, where parameters are initialized. In step 1720 it is determined whether it is time to compute new parameter values, in accordance with the present value of the computation interval. The present interval may be set to a constant value or may be variably set to different values. In step 1730 mobility parameter values are computed. In step 1740 a decision is made as to the value of the mobility parameter. If the mobility parameter value is high, then proceed to step 1750, trying a different algorithm. However, if the mobility parameter value is low, then proceed to step 1760 and use the selective antenna method.

Figure 18:
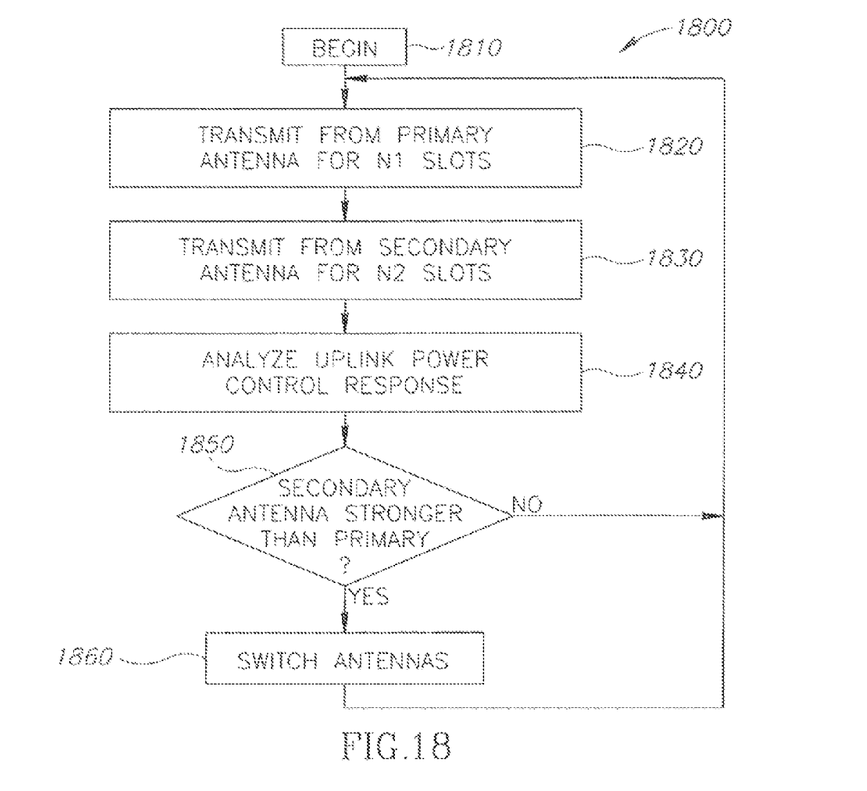
FIG. 18 is a flowchart illustrating one embodiment of a selective transmit diversity method according to the present invention.

FIG. 18 is a flowchart illustrating one embodiment of selective transmit diversity method according to embodiments of the present invention. FIG. 18 further illustrates the method of FIG. 16. The method 1800 begins at step 1810, and a transmission of N1 slots from the primary antenna is made in step 1820. Then a transmission of N2 slots is made using the secondary antenna in step 1830. Uplink power control response is analyzed in step 1840. A decision is made in step 1850 as to whether the signal from the secondary antenna is stronger than from the primary one. If it is, then antennas are switched in step 1860.

Figure 19:
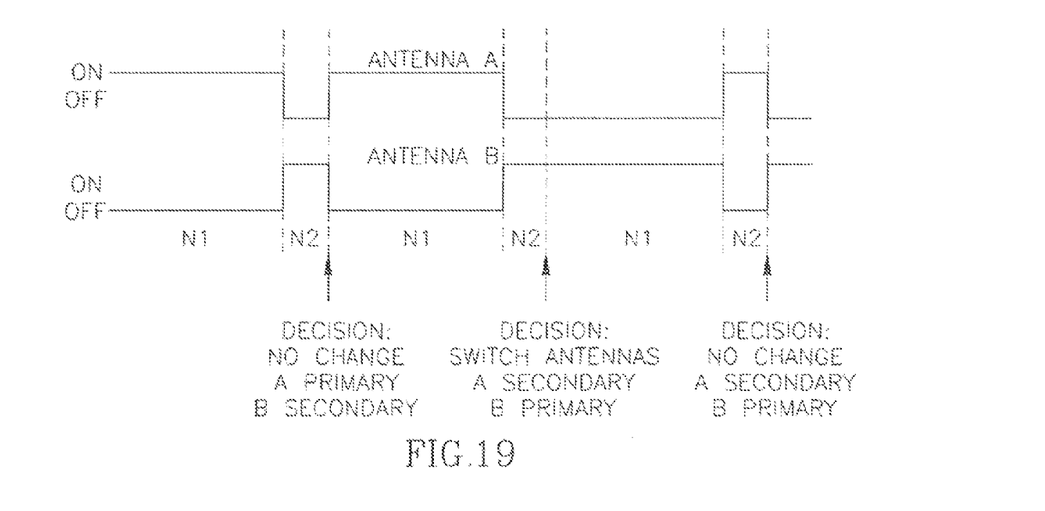
FIG. 19 is a timing diagram example corresponding to a method of the present invention, such as depicted in FIG. 18.

FIG. 19 is a timing diagram example corresponding to FIG. 18. Possible values for the method parameters may be, for example, N2=2 slots, and N1 may be determined according to the value of the mobility parameter.

Embodiments of this invention may apply to any transmit diversity control method. It will be understood that the methods discussed herein may be integrated with any transmit diversity control algorithm. It will further be understood that the present invention may be implemented as a stand-alone processing module, or may be integrated into a transmit diversity control processor, algorithm, or signal path circuitry.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A method for transmitting a transmit diversity signal from a communication device having a primary antenna and a secondary antenna, the method comprising:
- transmitting a signal from the primary antenna, and receiving a primary uplink power control response relating to the primary antenna;
- transmitting a signal from the secondary antenna, and receiving a secondary uplink power control response relating to the secondary antenna;
- comparing the primary uplink power control response to the secondary uplink power control response;
- switching the primary antenna and the secondary antenna;
- calculating at the communication device at least one mobility parameter, said mobility parameter indicating alteration in propagation of a signal transmitted between said communication device and a second device wherein calculating said at least one mobility parameter comprises calculating at least one power difference and incrementing a previous value of said mobility parameter if said power difference is greater than a threshold;
- calculating based on said at least one mobility parameter at least one diversity parameter; and
- transmitting a transmit diversity signal from said communication device using said at least one diversity parameter and the switched primary antenna and secondary antenna.

2. The method of claim 1, wherein the signal from the secondary antenna is transmitted for one slot out of every twenty slots.

3. The method of claim 1, wherein the signal from the secondary antenna is transmitted for two slots out of every twenty slots.

4. The method of claim 1, further comprising determining that the uplink power control response relating to the secondary antenna indicates a stronger signal than the uplink power control response relating to the primary antenna.

5. The method of claim 1, further comprising determining that the uplink power control response relating to the secondary antenna is 3 dB stronger than the uplink power control response relating to the primary antenna.

6. The method of claim 1, further comprising determining that the uplink power control response relating to the secondary antenna is stronger than the uplink power control response relating to the primary antenna, for eighty consecutive slots.

7. The method of claim 1, further comprising determining that the uplink power control response relating to the secondary antenna is stronger than the uplink power control response relating to the primary antenna, for one hundred milliseconds.

8. A method for transmitting a transmit diversity signal having a variable power ratio through a communication device having a first antenna and a second antenna, the method comprising:
- transmitting a first diversity signal from the first antenna and the second antenna, wherein the first diversity signal has a first power ratio;
- receiving a first uplink power control signal response relating to the first power ratio;
- transmitting a second diversity signal from the first antenna and the second antenna, wherein the second diversity signal has a second power ratio;
- receiving a second uplink power control response relating to the second power ratio;
- comparing the first uplink power control response to the second uplink power control response;
- replacing the first power ratio with the second power ratio;
- calculating at the communication device at least one mobility parameter, said mobility parameter indicating alteration in propagation of a signal transmitted between said communication device and a second device wherein calculating said at least one mobility parameter comprises calculating at least one power difference and incrementing a previous value of said mobility parameter if said power difference is greater than a threshold;
- calculating based on said at least one mobility parameter at least one diversity parameter; and
- transmitting a transmit diversity signal from said communication device using said at least one diversity parameter and the second power ratio.

9. The method of claim 8, wherein the second diversity signal is transmitted for one slot out of every ten to twenty slots.

10. The method of claim 8, wherein the second diversity signal is transmitted for two slots out of every ten to twenty slots.

11. The method of claim 8, further comprising determining that the uplink power control response relating to the second power ratio is stronger than the uplink power control response relating to the first power ratio.

* * * * *